(12) United States Patent
Itagaki et al.

(10) Patent No.: US 6,245,840 B1
(45) Date of Patent: Jun. 12, 2001

(54) POLYPROPYLENE RESIN-BASED FILMS AND SHEETS

(75) Inventors: Hiroshi Itagaki; Satoshi Tamura; Kouji Satou, all of Ichihara (JP)

(73) Assignee: Idemitsu Petrochemical Co. Ltd., Tokyo (JP)

(*) Notice: Subject to any disclaimer, the term of this patent is extended or adjusted under 35 U.S.C. 154(b) by 0 days.

(21) Appl. No.: 09/250,729

(22) Filed: Feb. 16, 1999

(30) Foreign Application Priority Data

Feb. 19, 1998 (JP) .................................................. 10-037221

(51) Int. Cl.$^7$ ....................................................... C08J 5/45
(52) U.S. Cl. ............................................... 524/91; 524/94
(58) Field of Search ........................................ 524/91, 94

(56) References Cited

U.S. PATENT DOCUMENTS 5,668,200 * 9/1997 Valet et al. ............................ 524/100

* cited by examiner

Primary Examiner—Peter D. Mulcahy
(74) Attorney, Agent, or Firm—Oblon, Spivak, McClelland, Maier & Neustadt, P.C.

(57) ABSTRACT

Provided are polypropylene-based films and sheets having good ultraviolet shieldability. While being stored, the films and the sheets are free from additive bleeding, and their outward appearance is kept all the time good. The films and the sheets are formed from a compositions comprising 100 parts by weight of a polypropylene-based resin and from 0.01 to 5 parts by weight of one or more compounds selected from the following (A) to (D):

(A) 2-(2-hydroxy-5-t-octylphenyl)benzotriazole,
(B) 2-(2H-benzotriazol-2-yl)-6-dodecyl-4-methylphenol,
(C) specific triazine compounds, and
(D) specific methylene-bisphenols.

16 Claims, No Drawings

POLYPROPYLENE RESIN-BASED FILMS AND SHEETS

BACKGROUND OF THE INVENTION

1. Field of the Invention

The present invention relates to polypropylene-based films and sheets having good ultraviolet shieldability, especially to such films and sheets that the ultraviolet absorbent additive existing therein does not bleed out, while they are stored, to detract from the outward appearance of the films and sheets stored.

2. Description of the Related Art

Heretofore, vinyl chloride-based resins have been used for surface-protective films for construction materials, furniture, etc. Because of the environmental problems with them, however, safer materials alternative to them are being investigated.

Polypropylene-based resins could be taken into consideration as candidates for the alternative materials, but their weather resistance is poor. Therefore, in order to establish the formulation of additives to the resins, especially to those for printed films, sheets and dry lamination films as laminated with adhesive, various studies have been made relating to the weather resistance and the adhesiveness retentivity of the films and sheets of the resins (see JP-A-5-92514, JP-A-6-212033).

In the additive formulation, it has heretofore been said that additives that vaporize less on molding are better, for which the data of heating loss are regarded as important. Surprisingly, however, it has been noted that, while shaped products of films or sheets are stored for about 10 days or so after their production, the additives existing therein often bleed out to greatly detract from the outward appearance of the films and sheets stored. The problem is often serious, but the reason for it is not clear.

SUMMARY OF THE INVENTION

The object of the invention is to provide polypropylene-based films and sheets having good ultraviolet shieldability, especially to provide such films and sheets that the additive existing therein does not bleed out, while they are stored, to detract from the outward appearance of the films and sheets stored.

We, the present inventors have assiduously studied so as to attain the object, and, as a result, have found that the reason for the additive bleeding that may occur during storage of molded articles has close relation to the compatibility between the resin and the additive in the molding materials, and that, for solving the problem of such additive bleeding, specific compounds are effective.

Based on these findings, we have completed the present invention, which is as follows:

(1) A film or sheet formed from a composition comprising 100 parts by weight of a polypropylene-based resin and from 0.01 to 5 parts by weight of one or more compounds selected from the following (A) to (D):

(A) 2-(2-hydroxy-5-t-octylphenyl)benzotriazole,
(B) 2-(2H-benzotriazol-2-yl)-6-dodecyl-4-methylphenol,
(C) a compound of a formula (I):

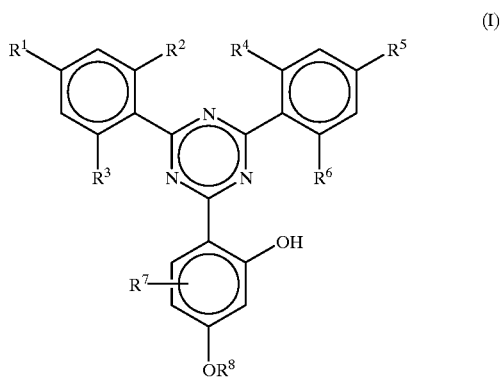

wherein $R^1$ to $R^8$ each represent a hydrogen atom, or an alkyl, aryl or alkoxy group having from 1 to 10 carbon atoms, and (D) a compound of a formula (II):

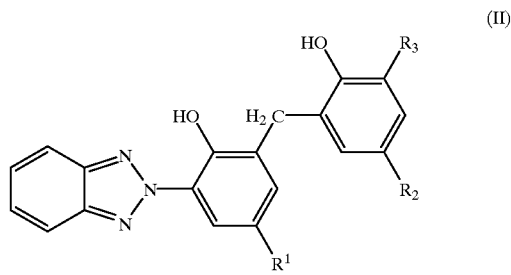

wherein $R_1$ to $R_3$ each represent a hydrogen atom, or an alkyl, aryl or alkoxy group having from 1 to 10 carbon atoms.

(2) The film or sheet of (1), wherein the compound of formula (I) is 2,4-bis(2,4-dimethylphenyl)-6-(2-hydroxy-4-n-octyloxyphenyl)-1,3,5-triazine.

(3) The film or sheet of (1), wherein the compound of formula (II) is 6-(2-benzotriazolyl)-4-t-octyl-6'-t-butyl-4'-methyl-2,2'-methylenebisphenol.

(4) A film or sheet formed from a composition comprising 100 parts by weight of a polypropylene-based resin and from 0.01 to 5 parts by weight of a combination of the following compounds (E) and (F):

(E) 2,2'-methylenebis[4-(1,1,3,3-tetramethylbutyl)-6-[(2H-benzotriazol-2-yl)phenol]], and
(F) 2-[2-hydroxy-3,5-bis(α,α'-dimethylbenzyl)phenyl]-2H-benzotriazole.

(5) The film or sheet of any one of (1) to (4), wherein the polypropylene-based resin has (i) a peak melting temperature (Tm) of 150° C. or above as measured through differential scanning calorimetry (DSC) and (ii) a tensile modulus of elasticity of from 200 to 700 MPa.

(6) The film or sheet of any one of (1) to (4), wherein the polypropylene-based resin comprises (a) from 20 to 100% by weight of a propylene homopolymer and/or copolymer with at most 4% by weight of other olefin units, which has (i) a peak melting temperature (Tm) of 150° C. or above as measured through differential scanning calorimetry (DSC), (ii) a tensile modulus of elasticity of from 200 to 700 MPa, (iii) a pentad fraction, rrrr/(1-mmmm)×100, as measured through isotopic carbon nuclear magnetic resonance spectrometry ($^{13}$C-NMR) of from 20 to 60%, and (iv) a melting enthalpy (ΔH) as measured through differential scanning calorimetry (DSC) of from 10 to 100 J/g, and (b) from 0 to 80% by weight of a propylene copolymer containing from 10 to 80% by weight of non-propylene olefin units.

(7) The film or sheet of (1), wherein the compound of formula (I) is 2-[4,6-di(2,4-xylyl)-1,3,5-triazin-2-yl]-5-octyloxyphenol.

DETAILED DESCRIPTION OF THE INVENTION

The invention is described in detail hereinunder.

[1] Polypropylene-based resin

The polypropylene-based resin for use in the invention preferably has a melt flow rate (MFR, as measured at 230° C. and under a load of 2.16 kg according to JIS-K7210) falling between 0.1 and 200 g/10 min, especially preferably between 5 and 60 g/10 min.

As specific examples of the polypropylene-based resin, mentioned are propylene homopolymers and propylene-ethylene random or block copolymers, which may be mixed with random or block copolymers of propylene with one or more α-olefins such as ethylene, butene-1, pentene-1, 4-methyl-pentene-1, hexene-1, octene-1 and the like. These may be further mixed with various types of synthetic rubber, for example, ethylene-propylene copolymer rubber, ethylene-propylene-non-conjugated diene copolymer rubber, polybutadiene, polyisoprene, polyethylene chloride, polypropylene chloride, styrene-ethylene-butadiene-styrene block copolymer (SEBS), styrene-butadiene-styrene block copolymer (SB block) and the like, to prepare resin compositions for use in the invention.

[1-1] Flexible polypropylene-based resin

As the polypropylene-based resin for use in the invention, more preferred is a flexible polypropylene-based resin, which is mentioned below.

The preferred, flexible polypropylene-based resin preferably has (i) a peak melting temperature (Tm) of 150° C. or above as measured through differential scanning calorimetry (DSC) and (ii) a tensile modulus of elasticity of from 200 to 700 MPa. The flexible polypropylene-based resin of that type is not specifically defined, and it may be a propylene homopolymer, or a propylene copolymer with any other olefins, or a mixture of these. Concretely, it may be (a) a propylene homopolymer and/or a propylene copolymer containing at most 4% by weight of other olefin units; or a composition comprising a resin of the component (a), and (b) a propylene copolymer that contains from 10 to 80% by weight of non-propylene olefin units.

Especially preferably, the flexible polypropylene-based resin comprises (a) from 20 to 100% by weight of a propylene homopolymer and/or copolymer with at most 4% by weight of other olefin units, which has, in addition to the peak melting temperature (Tm) of (i) and the tensile modulus of elasticity of (ii) defined above, (iii) a pentad fraction, rrrr/ (1-mmmm)×100, as measured through isotopic carbon nuclear magnetic resonance spectrometry ($^{13}$C-NMR) of from 20 to 60%, and (iv) a melting enthalpy (ΔH) as measured through differential scanning calorimetry (DSC) of from 10 to 100 J/g, and (b) from 0 to 80% by weight of a propylene copolymer containing from 10 to 80% by weight of non-propylene olefin units.

The preferred properties (i) to (iv) of the flexible polypropylene-based resin for use in the invention are described below.

First, the resin must have (i) a peak melting temperature (Tm) of 150° C. or above as measured through differential scanning calorimetry (DSC). If Tm of the resin is lower than 150° C., the resin composition could not have good heat resistance. Tm generally falls between 150 and 165° C. Tm is measured with Perkin-Elmer's DSC-7, in terms of the peak melting temperature according to JIS-K7121.

Next, the resin must have (ii) a tensile modulus of elasticity of from 200 to 700 MPa, but preferably from 400 to 600 MPa. If the modulus is smaller than 200 MPa, the strength and the stiffness of the resin composition will be poor. If, however, larger than 700 MPa, the flexibility and the low-temperature impact resistance of the resin composition will be poor. The tensile modulus of elasticity of the resin is measured according to JIS-K7113.

It is desirable that the resin has (iii) a pentad fraction, rrrr/(1-mmmm)×100, as measured through isotopic carbon nuclear magnetic resonance spectrometry ($^{13}$C-NMR) of from 20 to 60%. If the pentad fraction is smaller than 20% by weight, the resin composition will have poor heat resistance. If, however, larger than 60% by weight, the flexibility of the resin composition will be poor. For these reasons, the preferred range of the pentad fraction, rrrr/(1-mmmm)×100, falls between 25 and 55%. "rrrr" as referred to herein is meant to indicate the configuration of a polypropylene structure in which 5 side chains of methyl groups are positioned alternately in the opposite directions relative to the main chain of carbon—carbon bonds composed of any continuous 5 propylene units, or its proportion in the propylene polymer; and "mmmm" also referred to herein is meant to indicate the configuration of a polypropylene structure in which 5 side chains of methyl groups are positioned all in the same direction relative to the main chain of carbon—carbon bonds composed of any continuous 5 propylene units, or its proportion in the propylene polymer.

The value rrrr/(1-mmmm)×100 is measured as follows: Using JNM-FX-200 (manufactured by JOEL Ltd.; $^{13}$C-NMR frequency, 50.1 MHz), a polymer sample is subjected to $^{13}$C-NMR, for which the measuring mode is of proton complete decoupling, the pulse width is 6.9 μs (45°), the pulse repeating time is 3 seconds, the number of integrations is 10000, the solvent is 1,2,4-trichlorobenzene/heavy benzene (90/10, % by volume), the sample concentration is 250 mg/2.5 ml of solvent, and the system temperature is 130° C. Based on the difference in the chemical shift owing to the stereospecificity of the methyl groups in the polymer sample, or that is, on the area intensity ratio of each peak of mmmm to mrrm appearing in the range of from 19.5 to 22.5 ppm, the pentad fraction of the polymer sample is measured, and the value of rrrr/(1-mmmm)×100 is obtained.

mmmm: 21.86 ppm mmmr: 21.62 ppm mmrr: 21.08 ppm mmrm+rrmr: 20.89 ppm rrrr: 20.36 ppm mrrm: 19.97 ppm In addition, it is further preferable that the resin has (iv) a melting enthalpy (ΔH) as measured through differential scanning calorimetry (DSC) of from 10 to 100 J/g. If ΔH is larger than 100 J/g, the resin composition will lose flexibility and therefore the object of the invention could not be attained. More preferably, ΔH falls between 20 and 100 J/g. ΔH is measured with Perkin-Elmer's DSC-7 in terms of the total heat energy as absorbed by the polymer being melted, according to JIS-K7122. In measuring Tm and ΔH through DSC, the heating and cooling rate is 10° C./min.

It is also desirable that the component (a) comprising a propylene homopolymer and/or a propylene copolymer containing at most 4% by weight of other olefin units has a boiling n-heptane-insoluble content of from 40 to 95% by weight. If the boiling n-heptane-insoluble content of the component (a) is larger than 95% by weight, the resin composition will lose flexibility. However, if smaller than 40% by weight, the mechanical strength of the resin composition will poor. In view of the balance of the flexibility and the mechanical strength of the resin composition, the more preferred range of the boiling n-heptane-insoluble content of the component (a) falls between 45 and 90% by weight. The boiling n-heptane-insoluble content of the component (a) is calculated from the extraction residue of the component (a) having been extracted with boiling n-heptane for 6 hours in a Soxhlet's extraction tester.

In the component (a) that comprises a propylene homopolymer and/or a propylene copolymer containing at most 4% by weight of other olefin units, in general, carbons having side chains of methyl groups are not positioned adjacent to each other in the propylene chain moiety, or that is, there is no inverted carbon-to-carbon bonding therein. In these polymers, the carbons having side chains of methyl groups are alternately positioned in regular order in the propylene chain moiety. In other words, in the polymers for use in the invention, the propylene units are bonded in a mode of head-tail bonding, and there is substantially neither head—head bonding nor tail—tail bonding.

In the propylene copolymer containing at most 4% by weight of other olefin units that may be in the component (a), the comonomer olefins for the other olefin units include, for example, α-olefins such as ethylene, butene-1, pentene-1, 4-methyl-1-pentene, hexene-1, heptene-1, octene-1, nonene-1, decene-1, etc. Of those, preferred is ethylene. One or more of these olefins may be used either singly or as combined. It is necessary that the comonomer olefins are so used that the olefin-derived unit content of the resulting propylene copolymer is at most 4% by weight.

In the component (b) of a propylene copolymer that contains from 10 to 80% by weight of non-propylene olefin units, the comonomer olefins for the non-propylene olefin units include, for example, α-olefins such as ethylene, butene-1, pentene-1, 4-methyl-1-pentene, hexene-1, heptene-1, octene-1, nonene-1, decene-1, etc.; dienes such as butadiene, dicyclopentadiene, tricyclopentadiene, etc. One or more of these comonomer olefins may be used either singly or as combined.

Where the flexible polypropylene-based resin component for use in the invention contains the propylene copolymer of the component (b), the amount of the component (b) that may be in the resin component is at most 80% by weight. The presence of the component (b) in an amount of larger than 80% by weight is unfavorable in view of the strength, the elasticity and the heat resistance of the resin composition. Preferably, the amount of the component (b) that may be in the resin component is not larger than 70% by weight, more preferably not larger than 60% by weight.

In the flexible polypropylene-based resin for use in the invention, it is desirable that the polypropylene-based resin of the component (a) has a melt flow rate (MFR) falling between 0.5 and 200 g/10 min. If MFR of the component (a) is smaller than 0.5 g/10 min, the resin composition will be difficult to mold; but if larger than 200 g/10 min, the mechanical properties of the moldings of the composition will be poor. In view of the balance between the moldability and the mechanical properties of the moldings, the more preferred range of MFR falls between 2 and 100 g/10 min. MFR is measured under a load of 2.16 kg and at a temperature of 230° C.

The flexible polypropylene-based resin comprising the component (a) or the components (a) and (b) for use in the invention may be prepared, for example, through single-stage vapor-phase polymerization, single-stage slurry polymerization, multi-stage vapor-phase polymerization, multi-stage slurry polymerization, blending or the like. For example, where the resin is prepared through polymerization, propylene may be homopolymerized or copolymerized with any other olefins in the presence of a catalyst system comprising (W) a solid component that comprises 1) a solid catalyst component composed of magnesium, titanium, a halogen atom and an electron donor, optionally combined with 2) a crystalline polyolefin, (X) an organic aluminium compound, (Y) an alkoxy group-having aromatic compound, and optionally (Z) an electron-donating compound.

The solid component (W) comprises 1) a solid catalyst component composed of magnesium, titanium, a halogen atom and an electron donor, optionally combined with 2) a crystalline polyolefin. The solid catalyst component 1) comprises, as the indispensable ingredients, magnesium, titanium, a halogen atom and an electron donor. This may be prepared by contacting a magnesium compound and a titanium compound with an electron donor. In this case, the halogen atom may be in the magnesium compound and/or the titanium compound in the form of a halide.

The magnesium compound includes, for example, magnesium dihalides such as magnesium chloride, etc.; magnesium oxide, magnesium hydroxide, hydrotalcite, magnesium carboxylates; alkoxymagnesiums such as diethoxymagnesium, etc.; aryloxymagnesiums, alkoxymagnesium halides, aryloxymagnesium halides; alkylmagnesiums such as ethylbutylmagnesium, etc.; alkylmagnesium halides; as well as reaction products of organic magnesium compounds with electron donors, halosilanes, alkoxysilanes, silanols, aluminium compounds, etc. Of those, preferred are magnesium halides, alkoxymagnesiums, alkylmagnesiums and alkylmagnesium halides. One or more of these magnesium compounds may be used either singly or as combined.

As the magnesium compound, also usable are reaction products of metal magnesium, halogens and alcohols. The metal magnesium is not specifically defined, and may have any grain size. For example, employable is any of granular, ribbon-like or powdery metal magnesium. The surface condition of the metal magnesium is not also specifically defined. Preferably, however, the metal magnesium does not have a film of magnesium oxide or the like on its surface.

The alcohol is not also specifically defined, but preferably used is a lower alcohol having from 1 to 6 carbon atoms. Especially preferred is ethanol, as producing a solid catalyst component capable of greatly improving the expression of the catalyst capabilities. The purity and the water content of the alcohol are not also specifically defined. However, if an alcohol having a large water content is used, magnesium hydroxide may be formed on the surface of the metal magnesium. Therefore, preferred is an alcohol having a water content of not larger than 1% by weight, especially not larger than 2000 ppm. Alcohols having a smaller water content are better.

The halogens and/or the halogen-containing compounds for use in the invention are not specifically defined. Any and every compound containing a halogen atom in the molecule can be used herein. In the halogen-containing compounds, the type of the halogen atom is not specifically defined. Preferred is chlorine, bromine or iodine; and especially preferred is iodine. Of the halogen-containing compounds, especially preferred are halogen-containing metal compounds. Their condition, shape and grain size are not specifically defined and may be any desired ones. For example, the compounds may be used in the form of a solution in an alcoholic solvent (e.g., ethanol).

The amount of the alcohol to be used may falls between 2 and 100 mols, preferably between 5 and 50 mols, relative to one mol of the metal magnesium. If the alcohol is too much, magnesium compounds with good morphology are difficult to obtain. If too small, on the other hand, the reaction between the alcohol and the metal magnesium could not be effected smoothly.

The halogen and/or the halogen-containing compound may be used generally in an amount of not smaller than 0.0001 gram atoms, but preferably not smaller than 0.0005 gram atoms, more preferably not smaller than 0.001 gram atoms, in terms of the halogen atom relative to one gram atom of the metal magnesium. If it is smaller than 0.0001 gram atoms, and if the resulting magnesium compounds are directly used without being ground, the amount of the compound to be carried on the catalyst will be low and, in addition, the activity of the catalyst and even the stereospecificity and the morphology of the polymer formed will be poor. For these reasons, unfavorably, the magnesium compounds formed indispensably require grinding. By suitably varying the amount of the halogen and/or the halogen-containing compound to be used, the grain size of the magnesium compound to be formed can be controlled in any desired manner.

The reaction of the metal magnesium, the alcohol and the halogen and/or the halogen-containing compound may be effected in any per-se known manner. For example, a metal magnesium, an alcohol and a halogen and/or halogen-containing compound may be reacted under reflux until no hydrogen gas is formed, generally for about 20 to 30 hours to obtain the intended magnesium compound. Concretely, where iodine is used as the halogen, a metal magnesium and a solid iodine are put into an alcohol, and then heated under reflux; or an alcoholic solution a metal magnesium and iodine is dropwise added to an alcohol, and then heated under reflux; or an alcoholic solution of a metal magnesium is heated, to which is dropwise added an alcoholic solution of iodine. In any of these methods, it is desirable that the reaction is effected in an inert gas atmosphere of nitrogen gas, argon gas or the like, optionally in an inert organic solvent (e.g., saturated hydrocarbons such as n-hexane, etc.). Regarding the mode of putting the metal magnesium, the alcohol and the halogen and/or halogen-containing compound into a reactor, it is not always necessary that they are entirely put in the reactor prior to the start of the reaction, but they may be divided into plural portions and may be separately put into the reactor. In one preferred embodiment, the entire amount of an alcohol is first put into a reactor, and thereafter a metal magnesium having been divided into plural portions is added thereto intermittently.

In that embodiment, formation of a large amount of hydrogen gas at a time may be prevented. Therefore, the embodiment is especially preferred, as being safe. In addition, the size of the reactor for the embodiment may be small. Moreover, in the embodiment, the alcohol and the halogen and/or halogen-containing compound may be prevented from being bubbled due to the large amount of hydrogen gas formed at a time. The number of the plural portions of the metal magnesium to be separately added to the reactor may be determined, depending on the scale of the reactor used. In view of the easiness in handling the reaction system, in general, the number may be preferably from 5 to 10. Needless-to-say, the reaction may be effected either batchwise or continuously. In another modification, the entire amount of an alcohol is first put into a reactor, and a metal magnesium is added thereto little by little. Then, the product formed through the reaction is separated into a different tank, and thereafter the remaining metal magnesium is again added to the reactor also little by little. The removal of the product and the addition of the metal magnesium may be repeated.

The magnesium compound thus prepared is used in preparing the solid catalyst component. For this, the magnesium compound may be dried, or, after having been taken out through filtration, it may be washed with an inert solvent such as heptane or the like. In any case, the magnesium compound does not require grinding or classification for dressing, and may be used directly in the next step.

The titanium compound for use in the invention includes, for example, tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides, such as titanium tetrachloride, titanium tetrabromide, titanium tetraiodide, etc.; alkoxytitanium halides such as methoxytitanium trichloride, ethoxytitanium trichloride, propoxytitanium trichloride, n-butoxytitanium trichloride, ethoxytitanium tribromide, etc.; dialkoxytitanium dihalides such as dimethoxytitanium dichloride, diethoxytitanium dichloride, dipropoxytitanium dichloride, di-n-butoxytitanium dichloride, diethoxytitanium dibromide, etc.; trialkoxytitanium monohalides such as trimethoxytitanium chloride, triethoxytitanium chloride, tripropoxytitanium chloride, tri-n-butoxytitanium chloride, etc. Of those, preferred are high-halogen titanium compounds, and especially preferred is titanium tetrachloride. One or more of these titanium compounds may be used either singly or as combined.

The electron donor may be the same as the electron-donating compound for the component (Z), of which the examples will be mentioned hereinunder.

To prepare the solid catalyst component 1), employable are any known methods (see JP-A-53-43094, JP-A-55-135102, JP-A-55-135103, JP-A-56-18606, JP-A-56-166205, JP-A-57-63309, JP-A-57-190004, JP-A-57-300407, JP-A-58-47003).

The composition of the solid catalyst component 1) thus prepared is generally such that the atomic ratio of magnesium/titanium therein falls between 2 and 100, the atomic ratio of halogen/titanium falls between 5 and 100 and the molar ratio of electron donor/titanium falls between 0.1 and 10.

The crystalline polyolefin 2) that is optionally used in preparing the solid component (W) may be obtained from α-olefins having from 2 to 10 carbon atoms, including, for example, polyethylene, polypropylene, polybutene, poly-4-methyl-1-pentene, etc. The crystalline polyolefin may be prepared in any of (1) a method of prepolymerizing an olefin in the presence of a combination of the solid catalyst component 1) noted above, an aluminium compound and optionally an electron-donating compound (prepolymerization method); (2) a method of dispersing the solid catalyst component 1) noted above and optionally an organic aluminium compound and an electron-donating compound (having a melting point of not lower than 100° C.) into a powdery, crystalline polyethylene or polypropylene or the like having a uniform grain size (dispersion method); or (3) a combination of the methods (1) and (2).

In the prepolymerization method (1), the atomic ratio of aluminium/titanium generally falls between 0.1 and 100, preferably between 0.5 and 5, and the molar ratio of electron-donating compound/titanium falls between 0 and 50, preferably between 0.1 and 2.

In the solid component (W), the amounts of the solid catalyst component 1) and the crystalline polyolefin 2) are so controlled that the ratio by weight of 2) to 1) generally falls between 0.33 and 200, preferably between 1 and 50.

As the organic aluminium compound for the component (X), for example, preferably employed is any of trialkylaluminiums such as trimethylaluminium, triethylaluminium, triisopropylaluminium, triisobutylaluminium, trioctylaluminium, etc.; dialkylaluminium monohalides such as diethylaluminium monochloride, diisopropylaluminium monochloride, diisobutylaluminium monochloride, dioctylaluminium monochloride, etc.; alkylaluminium sesquihalides such as ethylaluminium sesquichloride, etc. One or more of these aluminium compounds may be used herein either singly or as combined.

The catalyst system to be used for producing the flexible polypropylene-based resin for use in the invention comprises an alkoxy group-having aromatic compound as the component (Y). As specific examples of the alkoxy group-having aromatic compound, mentioned are monoalkoxy compounds such as m-methoxytoluene, o-methoxyphenol, m-methoxyphenol, 2-methoxy-4-methylphenol, vinylanisole, p-(1-propenyl)anisole, p-allylanisole, 1,3-bis(p-methoxyphenyl)-1-pentene, 5-allyl-2-methoxyphenol, 4-hydroxy-3-methoxybenzyl alcohol, methoxybenzyl alcohol, nitroanisole, nitrophenetole, etc.; dialkoxy compounds such as o-dimethoxybenzene, m-dimethoxybenzene, p-dimethoxybenzene, 3,4-dimethoxytoluene, 2,6-dimethoxyphenol, 1-allyl-3,4-dimethoxybenzene, etc.; trialkoxy compounds such as 1,3,5-trimethoxybenzene, 5-allyl-1,2,3-trimethoxybenzene, 5-allyl-1,2,4-trimethoxybenzene, 1,2,3-trimethoxy-5-(1-propenyl)benzene, 1,2,4-trimethoxy-5-(1-propenyl)benzene, 1,2,3-trimethoxybenzene, 1,2,4-trimethoxybenzene, etc. Of those, preferred are dialkoxy compounds and trialkoxy compounds. One or more of these alkoxy group-having aromatic compounds may be used either singly or as combined.

The catalyst optionally contains an electron-donating compound as the component (Z). The electron-donating compound has any of oxygen, nitrogen, phosphorus, sulfur, silicon, etc. Basically, any one capable of improving the specificity of the catalyst in polymerization of propylene may be used as the electron-donating compound for the component (Z).

The electron-donating compound of that type includes, for example, organic silicon compounds, esters, thioesters, amines, ketones, nitriles, phosphines, ethers, thioethers, acid anhydrides, acid halides, acid amides, aldehydes, organic acids, azo compounds, etc.

For example, employable are organic silicon compounds such as diphenyldimethoxysilane, diphenyldiethoxysilane, dibenzyldimethoxysilane, tetramethoxysilane, tetraethoxysilane, tetraphenoxysilane, methyltrimethoxysilane, methyltriethoxysilane, methyltriphenoxysilane, phenyltrimethoxysilane, phenyltriethoxysilane, benzyltrimethoxysilane, cyclohexylmethyldimethoxysilane, etc.; aromatic mono- or di-carboxylates such as monomethyl phthalate, monoethyl phthalate, monopropyl phthalate, monobutyl phthalate, monoisobutyl phthalate, monoamyl phthalate, monoisoamyl phthalate, monomethyl terephthalate, monoethyl terephthalate, monopropyl terephthalate, monobutyl terephthalate, monoisobutyl terephthalate, dimethyl phthalate, diethyl phthalate, dipropyl phthalate, dibutyl phthalate, diisobutyl phthalate, diamyl phthalate, diisoamyl phthalate, methylethyl phthalate, methylisobutyl phthalate, methylpropyl phthalate, ethylbutyl phthalate, ethylisobutyl phthalate, ethylpropyl phthalate, propylisobutyl phthalate, dimethyl terephthalate, diethyl terephthalate, dipropyl terephthalate, diisobutyl terephthalate, methylethyl terephthalate, methylisobutyl terephthalate, methylpropyl terephthalate, ethylbutyl terephthalate, ethylisobutyl terephthalate, ethylpropyl terephthalate, propylisobutyl terephthalate, dimethyl isophthalate, diethyl isophthalate, dipropyl isophthalate, diisobutyl isophthalate, methylethyl isophthalate, methylisobutyl isophthalate, methylpropyl isophthalate, ethylbutyl isophthalate, ethylisobutyl isophthalate, ethylpropyl isophthalate, propylisobutyl isophthalate, etc.; monoesters such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, ethyl dichloroacetate, methyl methacrylate, ethyl crotonate, ethyl pivalate, dimethyl maleate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate, ethyl naphthoate, etc.; esters such as γ-butyrolactone, δ-valerolactone, coumarin, phthalide, ethylene carbonate, etc.; organic acids such as benzoic acid, p-hydroxybenzoic acid, etc.; acid anhydrides such as succinic anhydride, benzoic anhydride, p-toluic anhydride, etc.; ketones such as acetone, methyl ethyl ketone, methyl isobutyl ketone, acetophenone, benzophenone, benzoquinone, etc.; aldehydes such as acetaldehyde, propionaldehyde, octylaldehyde, tolualdehyde, benzaldehyde, naphthylaldehyde, etc.; acid halides such as acetyl chloride, acetyl bromide, propionyl chloride, butyryl chloride, isobutyryl chloride, 2-methylpropionyl chloride, valeryl chloride, isovaleryl chloride, hexanoyl chloride, methylhexanoyl chloride, 2-ethylhexanoyl chloride, octanoyl chloride, decanoyl chloride, undecanoyl chloride, hexadecanoyl chloride, octadecanoyl chloride, benzylcarbonyl chloride, dicyclohexanecarbonyl chloride, malonyl dichloride, succinyl dichloride, pentanedioleyl dichloride, hexanedioleyl dichloride, cyclohexanedicarbonyl dichloride, benzoyl chloride, benzoyl bromide, methylbenzoyl chloride, phthaloyl chloride, isophthaloyl chloride, terephthaloyl chloride, benzene-1,2,4-tricarbonyl trichloride, etc.; ethers such as methyl ether, ethyl ether, isopropyl ether, n-butyl ether, isopropyl methyl ether, isopropyl ethyl ether, t-butyl ethyl ether, t-butyl n-propyl ether, t-butyl n-butyl ether, t-amyl methyl ether, t-amyl ethyl ether, amyl ether, tetrahydrofuran, anisole, diphenyl ether, ethylene glycol butyl ether, etc.; acid amides such as acetic acid amide, benzoic acid amide, toluic acid amide, etc.; amines such as tributylamine, N,N'-dimethylpiperazine, tribenzylamine, aniline, pyridine, pyrroline, tetramethylethylenediamine, etc.; nitriles such as acetonitrile, benzonitrile, tolunitrile, etc.; azo compounds having a steric hindrance substituent as bonded to the azo bond, such as 2,2'-azobis(2-methylpropane), 2,2'-azobis(2-ethylpropane), 2,2'-azobis(2-methylpentane), etc.

Of those, preferred are organic silicon compounds, esters, ketones, ethers, thioethers, acid anhydrides, and acid halides. Especially preferred are organic silicon compounds such as diphenyldimethoxysilane, phenyltriethoxysilane, cyclohexylmethyldimethoxysilane, etc.; aromatic dicarboxylates such as di-n-butyl phthalate, diisobutyl phthalate, etc.; alkyl esters of aromatic monocarboxylic acids such as benzoic acid, p-methoxybenzoic acid, p-ethoxybenzoic acid, toluic acid, etc. One or more of these electron-donating compounds may be used either singly or as combined.

Regarding the amounts of the components for the catalyst system, the solid component (W) may be used in an amount of generally from 0.0005 to 1 mol, in terms of the titanium atom, relative to one liter of the reaction volume. The organic aluminium compound (X) may be in an amount of generally from 1 to 3000, but preferably from 40 to 800, in terms of the atomic ratio of aluminium/titanium. If the amounts overstep the defined ranges, the catalytic activity of the catalyst will be low. The alkoxy group-having aromatic compound (Y) may be in an amount of generally from 0.01 to 500, but preferably from 1 to 300, in terms of the molar ratio relative to the titanium atom in the solid component (W). If the amount is smaller than 0.01, the physical properties of the polymer to be produced will be bad. If, however, larger than 500, the catalytic activity of the catalyst will be poor.

To prepare the component (a) for the flexible polypropylene-based resin for use in the invention that comprises a propylene homopolymer and/or a propylene copolymer containing at most 4% by weight of other olefin units, for example, propylene may be homopolymerized or copolymerized with a small amount of other olefins in one-stage polymerization using the catalyst system noted above. To prepare a mixture of the component (a) and the component (b) of a propylene copolymer, for the flexible polypropylene-based resin, for example, a resin of the component (a) is first produced in the first polymerization step (one-stage polymerization) in the same manner as previously, and thereafter propylene is copolymerized with other olefins in the next polymerization step to form the propylene copolymer for the component (b).

The polymerization mode for preparing the components (a) and (b) is not specifically defined, including, for example, slurry polymerization, vapor-phase polymerization, bulk polymerization, solution polymerization, suspension polymerization, etc.

Where a resin of the component (a) is prepared in vapor-phase polymerization, for example, the polymerization pressure generally falls between 10 and 45 kg/cm², preferably between 20 and 30 kg/cm², and the polymerization temperature generally falls between 40 and 90° C., preferably between 60 and 75° C. Where a propylene copolymer of the component (b) is prepared also in vapor-phase polymerization, for example, the polymerization pressure generally falls between 5 and 30 kg/cm², preferably between 10 and 20 kg/cm², and the polymerization temperature generally falls between 20 and 90° C., preferably between 40 and 60° C. In any stage of polymerization, the molecular weight of the polymer to be formed may be controlled by any ordinary means, for example, by controlling the hydrogen concentration in the polymerization reactor. If desired, (co)polymers having a relatively high molecular weight may be formed in the polymerization step, and the resulting (co)polymers may be mixed in melt with an organic peroxide so as to control their molecular weight to fall within a desired range. The polymerization time may fall between 5 minutes and 10 hours or so.

In producing polymers in the presence of the catalyst system, the components (W) to (Z) to constitute the catalyst system are mixed in a predetermined ratio and contacted with each other, and thereafter the starting monomers may be immediately introduced into the catalyst system to start the polymerization. Alternatively, after the thus-prepared catalyst system is ripened for 0.2 to 3 hours, the starting monomers may be introduced thereinto. If desired, the catalyst components may be applied to the polymerization system, after having been suspended in the inert solvent to be used or in the starting monomers of olefins to be polymerized.

After the polymerization, the polymers produced may be post-treated in any ordinary manner. For example, in vapor-phase polymerization, the powdery polymer produced is taken out of the polymerization reactor, into which nitrogen or the like may be introduced in streams so as to remove the non-reacted monomers and others from the polymer. If desired, the powdery polymer may be pelletized through an extruder. In this case, a small amount of water, an alcohol or the like may be added to the polymer so as to completely inactivate the remaining catalyst. In bulk polymerization, the polymer produced is taken out of the polymerization reactor, then the non-reacted monomers are removed from the polymer, and thereafter the polymer may be pelletized.

Where a flexible polypropylene-based resin comprising the components (a) and (b) is used in the invention, a resin for the component (a) and that for the component (b) may be separately prepared, and these may be mixed in a predetermined ratio in any known manner (for example, through dry blending, solution blending, or kneading) to prepare a mixture of the components (a) and (b).

[2] Ultraviolet absorbent:

The ultraviolet absorbent for use in the invention includes:

(A) 2-(2-hydroxy-5-t-octylphenyl)benzotriazole, (B) 2-(2H-benzotriazol-2-yl)-6-dodecyl-4-methylphenol, (C) a compound of a formula (I):

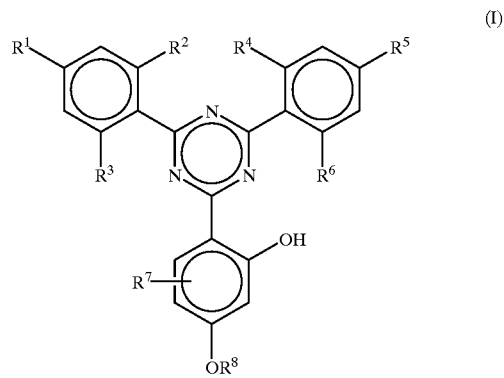

wherein $R^1$ to $R^8$ each represent a hydrogen atom, or an alkyl, aryl or alkoxy group having from 1 to 10 carbon atoms, and (D) a compound of a formula (II):

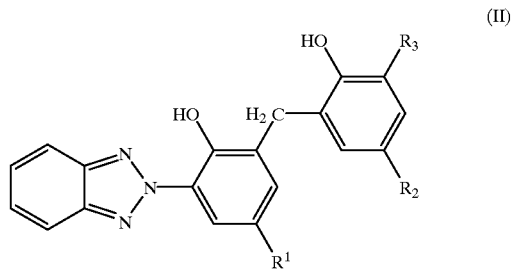

wherein $R_1$ to $R_3$ each represent a hydrogen atom, or an alkyl, aryl or alkoxy group having from 1 to 10 carbon atoms.

Of those ultraviolet absorbents, the compounds (A) and (B) are benzotriazoles. Among various benzotriazole compounds, selecting the specific benzotriazoles (A) and (B) is of significant importance, and these are especially preferred for attaining the effect of the invention.

Combining the following benzotriazole compounds (E) and (F) is also effective in the invention.

(E) 2,2'-methylenebis[4-(1,1,3,3-tetramethylbutyl)-6-[(2H-benzotriazol-2-yl)phenol]], and (F) 2-[2-hydroxy-3,5-bis(α,α'-dimethylbenzyl)phenyl]-2H-benzotriazole.

In their combination, the ratio by weight of the compound (E) to the compound (F) preferably falls between 1:9 and 9:1.

As the compound (C) of formula (I), especially preferred are 2,4-bis(2,4-dimethylphenyl)-6-(2-hydroxy-4-n-octyloxyphenyl)-1,3,5-triazine and 2-[4,6-di(2,4-xylyl)-1,3,5-triazin-2-yl]-5-octyloxyphenol; and as the compound (D) of formula (II), especially preferred is 6-(2-benzotriazolyl)-4-t-octyl-6'-t-butyl-4'-methyl-2,2'-methylenebisphenol.

100 parts by weight of a polypropylene-based resin is mixed with from 0.01 to 5 parts by weight, preferably from 0.05 to 2.5 parts by weight, more preferably from 0.25 to 2.0 parts by weight of one or more selected from the compounds (A) to (D) noted above, or both the compounds (E) and (F). For this, 2,4-bis(2,4-dimethylphenyl)-6-(2-hydroxy-4-n-octyloxyphenyl)-1,3,5-triazine is especially preferred as the compound (C) of formula (I), and 6-(2-benzotriazolyl)-4-t-octyl-6'-t-butyl-4'-methyl-2,2'-methylenebisphenol is especially preferred as the compound (D) of formula (II). If the amount of the ultraviolet absorbent added to the resin is smaller than 0.01 parts by weight, it will be difficult to prevent the films, sheets ant their various secondary worked products of the resin from being aged. On the other hand, even if its amount is larger than 5 parts by weight, adding such a large amount of the ultraviolet absorbent could produce little increase in its effect, but will rather result in its bleeding out.

If desired, any other benzotriazole-based ultraviolet absorbents, benzophenone-based ultraviolet absorbents and hindered amine-based light stabilizers may be added to the resin composition in accordance with the use of the resin products, without detracting from the object of the invention.

The other benzotriazole-based ultraviolet absorbents include, for example, 2-(3,5-di-t-butyl-2-hydroxyphenyl)-5-chlorobenzotriazole, 2-(3-t-butyl-5-methyl-2-hydroxyphenyl)-5-chlorobenzotriazole, 2-(3,5-di-t-amyl-2-hydroxyphenyl)benzotriazole, 2-(3,5-di-t-butyl-2-hydroxyphenyl)benzotriazole, 2-(5-t-butyl-2-hydroxyphenyl)benzotriazole, 2-[2-hydroxy-3-(3,4,5,6-tetrahydrophthalimidomethyl)-5-methylphenyl]benzotriazole, 2-(2-hydroxy-4-octyloxyphenyl) benzotriazole, reaction products of methyl 3-[3-(2H-benzotriazol-2-yl)-5-t-butyl-4-hydroxyphenyl]propionate/ polyethylene glycol 300, 2-(3,5-di-t-pentyl-2-hydroxyphenyl)-2H-benzotriazole, 2-(2H-benzotriazol-2-yl)-4-methyl-6-(3,4,5,6-tetrahydrophthalimidylmethyl) phenol, etc.

The benzophenone-based ultraviolet absorbents include, for example, 2,4-dihydroxybenzophenone, 2-hydroxy-4-n-dodecyloxybenzophenone, 1,4-bis(4-benzoyl-3-hydroxyphenoxy)butane, etc.

The hindered amine-based light stabilizers include, for example, bis(2,2,6,6-tetramethyl-4-piperidyl) sebacate, tetrakis(2,2,6,6-tetramethyl-4-piperidyl) 1,2,3,4-butane-tetracarboxylate, 2,2,6,6-tetramethyl-4-piperidyl benzoate, bis-(1,2,2,6,6-pentamethyl-4-piperidyl) 2-(3,5-di-t-butyl-4-hydroxybenzyl)-2-n-butylmalonate, bis-(N-methyl-2,2,6,6-tetramethyl-4-piperidyl) sebacate, 1,1'-(1,2-ethanediyl)-bis(3,3,5,5-tetramethylpiperadinone), (mixed 2,2,6,6-tetramethyl-4-piperidyl/tridecyl) 1,2,3,4-butane-tetracarboxylate, (mixed 1,2,2,6,6-pentamethyl-4-piperidyl/tridecyl) 1,2,3,4-butane-tetracarboxylate, tetrakis(1,2,2,6,6-pentamethyl-4-piperidyl) 1,2,3,4-butane-tetracarboxylate, 1-[2-[3-(3,5-di-t-butyl-4-hydroxyphenyl)propionyloxy] ethyl]-4-[3-(3,5-di-t-butyl-4-hydroxyphenyl)propionyloxy]-2,2,6,6-tetramethylpiperidine, 8-benzyl-7,7,9,9-tetramethyl-3-octyl-1,3,8-triazaspiro[4,5]undecane-2,4-dione, 8-acetyl-3-dodecyl-7,7,9,9-tetramethyl-1,3,8-triazaspiro[4,5]decane-2,4-dione, bis(1-octyloxy-2,2,6,6-tetramethyl-4-piperidyl) sebacate, etc.

[3] Formulation and shaping:

In the invention, a polypropylene-based resin may be mixed with the ultraviolet absorbent mentioned above and optionally with any other various additives of, for example, other ultraviolet absorbents, phenol-based stabilizers, organic phosphite-based stabilizers, thioether-based stabilizers, as well as inorganic or organic fillers, antistatic agents, chlorine-trapping agents, anti-blocking agents, anti-foggants, organic flame retardants, flame retardation promoters, dyes, pigments, natural oils, synthetic oils, waxes, etc. To mix them, any ordinary known methods are employable. For example, they may be mixed in a tumbler blender, a Henschel mixer or the like, or, after having been mixed, the resulting mixture may be melt-kneaded and granulated through a single-screw or multi-screw extruder, or through a kneader, a Bumbury mixer or the like. If desired, a high-concentration ultraviolet absorbent such as that mentioned above may be kneaded in a polypropylene-based resin to prepare a master batch, and the resulting master batch may be mixed with an additional polypropylene-based resin to produce the intended polypropylene-based resin composition.

When prepared in the form of a powdery polymer through polymerization, the flexible polypropylene-based resin for use in the invention may be degraded with a peroxide in an extruder, thereby having a lower molecular weight. The resin composition containing the thus-degraded resin is easy to handle while it is molded. The resin having been degraded with a peroxide to have a lowered molecular weight may have an increased degree of fluidity, but its pentad fraction, peak melting temperature and melting enthalpy change little. The peroxide to be used for that purpose includes, for example, 2,5-dimethyl-2,5-di-(t-butylperoxy)-hexane, 1,3-bis(t-butylperoxyisopropyl)benzene, 2,5-dimethyl-2,5-di-(t-butylperoxy)hexyne-3, etc. When the resin is mixed with the peroxide, an antioxidant, a stabilizer and a chlorine-trapping agent may be optionally but preferably added thereto.

In the invention, the molding material of a polypropylene-based resin to which has been added the additives noted above may be molded into films and sheets in any known molding method of, for example, inflation molding, cast molding, calender molding or the like.

The films and sheets may be further subjected to secondary working of, for example, sticking a printed substrate onto them or shaping them in vacuum to produce various final shaped articles such as decorative films, protective films, etc.

In the films and sheets of the invention, the additives are effectively prevented from bleeding out to detract from the surface appearance of the films and sheets, even while the films and sheets are stored under ordinary room temperature conditions on standby for the subsequent secondary working of, for example, lamination with substrates or printing.

The invention is described in more detail hereinunder with reference to the following Examples.

EXAMPLE 1

1. Production of Flexible Polypropylene Resin
1-1. Preparation of Magnesium Compound A glass reactor having a volume of about 6 liters and equipped with a stirrer was fully purged with nitrogen gas, into which were put about 2,430 g of ethanol, 16 g of iodine and 160 g of metal magnesium. These were heated and reacted with stirring under reflux, until hydrogen gas was no more formed in the reaction system, to produce a solid reaction product. The reaction mixture containing the solid product thus produced therein was dried under reduced pressure to obtain a magnesium compound.

1-2. Preparation of Solid Catalyst Component (W)

Into a 5-liter glass reactor having been fully purged with nitrogen gas, put were 160 g of the magnesium compound (not ground) obtained in 1-1, 800 ml of pure heptane, 24 ml of silicon tetrachloride, and 23 ml of diethyl phthalate. Then, the reaction system was kept at 80° C., and 770 ml of titanium tetrachloride was added thereto with stirring, and reacted at 110° C. for 2 hours. The resulting solid component was taken out, and washed with pure heptane at 90° C. To this was added 1,220 ml of titanium tetrachloride, and reacted at 110° C. for 2 hour. Then, this was fully washed with pure heptane to obtain a solid catalyst component (W).

1-3. Vapor-Phase Polymerization

Into a 200-liter polymerization reactor, fed were the solid catalyst component (W) obtained in 1-2 at a rate of 6.0 g/hr, triisobutylaluminium (TIBA) at a rate of 0.2 mols/hr, 1-allyl-3,4-dimethoxybenzene (ADMB) at a rate of 0.006 mols/hr, cyclohexylmethyldimethoxysilane (CHMDMS) at a rate of 0.003 mols/hr, and propylene at a rate of 43 kg/hr. In this, the monomer was polymerized at 70° C. and 28 kg/cm$^2$G. The amount of the polymer thus formed was 30 kg/hr.

The polymer had a limiting viscosity [η] (135° C., in decalin) of 5.04 dl/g.

The boiling n-heptane-insoluble content of the polymer was 88.2% by weight. The boiling n-heptane-insoluble component in the polymer had [η] of 5.42 dl/g, and the boiling n-heptane-soluble component therein had [η] of 2.07 dl/g.

On the other hand, the pentad fraction, rrrr/(1-mmmm)×100, of the homopolymer as calculated from its $^{13}$C-NMR spectral pattern was 24.2%; the peak melting temperature (Tm) thereof as measured through DSC was 158.7° C.; and the melting enthalpy (ΔH) thereof was 80.7 J/g. No inverted bonding against the head-tail bonding of the propylene units in the polymer was found.

The powdery polymer obtained herein was mixed with 2,5-dimethyl-2,5-di-(t-butylperoxy)-hexane, to which were added an antioxidant, a stabilizer and a chlorine-trapping agent. The resulting mixture was extruded through a 40-mmφ die to obtain pellets having a melt flow rate (MFR, 230° C., 2.16 kgf) of 2.5 g/10 min. On the other hand, the polymer was degraded with a peroxide to reduce its molecular weight. There was found no change in the pentad fraction, the peak melting temperature and the melting enthalpy between the original polymer and the degraded, low-molecular weight polymer. The resin obtained herein had a tensile modulus of elasticity of 500 MPa.

2. Film Formation and Evaluation of Film Samples 100 kg of the flexible polypropylene resin pellets produced herein were mixed with 1.1 kg of an ultraviolet absorbent, 2-(2-hydroxy-5-t-octylphenyl)benzotriazole (Cyasorb UV5411 from Cytec Industries Co.), and extruded through a 40-mmφ T-die extruder (molding temperature: 270° C.) to give a film having a thickness of 100 μm. The ultraviolet transmittance of the single film was measured, using a Shimadzu's auto-spectrophotometer UV2400, and it was not larger than 3% at 300 nm in the UV range.

The bleeding resistance of the film was evaluated, with the temperature conditions in storehouses in summer or those in the step of curing urethane-based adhesive for film lamination being taken into consideration. Concretely, the film was kept in a Geer's oven at 40° C. for 240 hours, and checked for its outward appearance and haze.

The degree of haze of the film was measured according to JIS-K7105, for which was used Nippon Denshoku Kogyo's 1001DP. "Δhaze" indicates the difference in haze between the film before the test and that after the test.

For its outward appearance, the film was visually checked. "○" indicates no change in the tested film as compared with the fresh one. "X" indicates that the surface of the tested film was whitened owing to additive bleeding.

The test data obtained are shown in Table 1.

EXAMPLE 2

Film samples were prepared and evaluated in the same manner as in Example 1, except that 2-(2H-benzotriazol-2-yl)-6-dodecyl-4-methylphenol (Tinuvin 571 from Ciba Specialty Chemicals Co.) was used as the ultraviolet absorbent. The test data are shown in Table 1.

EXAMPLE 3

Film samples were prepared and evaluated in the same manner as in Example 1, except that 2,4-bis(2,4-dimethylphenyl)-6-(2-hydroxy-4-n-octyloxyphenyl)-1,3,5-triazine (Cyasorb UV1164 from Cytec Industries Co.) was used as the ultraviolet absorbent. The test data are shown in Table 1.

EXAMPLE 4

Film samples were prepared and evaluated in the same manner as in Example 1, except that 6-(2-benzotriazolyl)-4-t-octyl-6'-t-butyl-4'-methyl-2,2'-methylenebisphenol (JAST-500 from Johoku Chemical Industry Co.) was used as the ultraviolet absorbent. The test data are shown in Table 1.

EXAMPLE 5

Film samples were prepared and evaluated in the same manner as in Example 1, except that a combination of 0.7 kg of 2,2'-methylene-bis[4-(1,1,3,3-tetramethylbutyl)-6-[(2H-benzotriazol-2-yl)phenol]] (Adekastab LA31 from Asahi Denka Kogyo KK) and 0.4 kg of 2-[2-hydroxy-3,5-bis(α,α'-dimethylbenzyl)phenyl]-2H-benzotriazole (Tinuvin 234 from Ciba Specialty Chemicals Co.) was used as the ultraviolet absorbent. The test data are shown in Table 1.

EXAMPLE 6

Film samples were prepared and evaluated in the same manner as in Example 1, except that a combination of 0.4 kg of 2,2'-methylene-bis[4-(1,1,3,3-tetramethylbutyl)-6-[(2H-benzotriazol-2-yl)phenol]] (Adekastab LA31 from Asahi Denka Kogyo KK) and 0.7 kg of 2-[2-hydroxy-3,5-bis(α,α'-dimethylbenzyl)phenyl]-2H-benzotriazole (Tinuvin 234 from Ciba Specialty Chemicals Co.) was used as the ultraviolet absorbent. The test data are shown in Table 1.

COMPARATIVE EXAMPLE 1

Film samples were prepared and evaluated in the same manner as in Example 5, except that 1.1 kg of 2,2'- methylene-bis[4-(1,1,3,3-tetramethylbutyl)-6-[(2H-benzotriazol-2-yl)phenol]] (Adekastab LA31 from Asahi Denka Kogyo KK) was used singly as the ultraviolet absorbent. The test data are shown in Table 1.

known that the compounds used singly in the former bled out to cause the change in the outward appearance of the film samples, while those used in combination in the latter did not bleed out.

TABLE 1

| | Amount of Ultraviolet Absorbent Added (wt. pts.) | | | | | | | | | Evaluation for Bleeding Resistance | |
|---|---|---|---|---|---|---|---|---|---|---|---|
| | A | B | C | D | E | F | G | H | I | Outward Appearance | Δhaze (%) |
| Example 1 | 1.1 | | | | | | | | | ○ | 0.0 |
| Example 2 | | 1.1 | | | | | | | | ○ | 0.1 |
| Example 3 | | | 1.1 | | | | | | | ○ | 0.3 |
| Example 4 | | | | 1.1 | | | | | | ○ | 0.1 |
| Example 5 | | | | | 0.7 | 0.4 | | | | ○ | 0.0 |
| Example 6 | | | | | 0.4 | 0.7 | | | | ○ | 0.1 |
| Comparative Example 1 | | | | | 1.1 | | | | | X | 14.4 |
| Comparative Example 2 | | | | | | 1.1 | | | | X | 8.3 |
| Comparative Example 3 | | | | | | | 1.1 | | | X | 10.2 |
| Comparative Example 4 | | | | | | | | 1.1 | | X | 13.9 |
| Comparative Example 5 | | | | | | | | | 1.1 | X | 11.1 |

COMPARATIVE EXAMPLE 2

Film samples were prepared and evaluated in the same manner as in Example 6, except that 1.1 kg of 2-[2-hydroxy-3,5-bis(α,α'-dimethylbenzyl)phenyl]-2H-benzotriazole (Tinuvin 234 from Ciba Specialty Chemicals Co.) was used singly as the ultraviolet absorbent. The test data are shown in Table 1.

COMPARATIVE EXAMPLE 3

Film samples were prepared and evaluated in the same manner as in Example 1, except that 2-(5-methyl-2-hydroxyphenyl)benzotriazole (Tinuvin P from Ciba Specialty Chemicals Co.) was used as the ultraviolet absorbent (G). The test data are shown in Table 1.

COMPARATIVE EXAMPLE 4

Film samples were prepared and evaluated in the same manner as in Example 1, except that 2,4-dihydroxybenzophenon (Sumisorb 100 from Sumitomo Chemicals Co.) was used as the ultraviolet absorbent (H). The test data are shown in Table 1.

COMPARATIVE EXAMPLE 5

Film samples were prepared and evaluated in the same manner as in Example 1, except that 2,4-di-t-butylphenyl-3,5-di-t-butyl-4-hydroxybenzoate (Tinuvin 120 from Ciba Specialty Chemicals Co.) was used as the ultraviolet absorbent (I). The test data are shown in Table 1.

In Examples 1 to 6, neither additive bleeding to cause the change in outward appearance nor increase in the haze was found in the visual observation of the film samples. In Comparative Examples 1 to 5, however, the additive bled out to change the outward appearance (or to whiten the surface) of the film samples, and, in addition, as the film samples whitened, their haze increased. As in Comparative Examples 1 and 2 as compared with Examples 5 and 6, it is The films and the sheets of the invention as produced by molding a polypropylene-based resin composition containing an ultraviolet absorbent selected from specific benzotriazole compounds, triazine compounds and methylenebisphenol compounds are, while stored in practical conditions (for example, at 40° C. for 240 hours), free from additive bleeding. During practical storage, therefore, the outward appearance of the films and the sheets is all the time kept good.

While the invention has been described in detail and with reference to specific embodiments thereof, it will be apparent to one skilled in the art that various changes and modifications can be made therein without departing from the spirit and scope thereof.

What is claimed is:

1. A film or sheet formed from a composition comprising 100 parts by weight of a polypropylene-based resin and from 0.01 to 5 parts by weight of a combination of the following compounds (E) and (F):

(E) 2,2'-methylenebis{4-(1,1,3,3-tetramethylbutyl)-6-{(2H-benzotriazol-2-yl)phenol}}, and
    (F) 2-{2-hydroxy-3,5-bis(α,α'-dimethylbenzyl)phenyl}-2H-benzotriazole;
    wherein the ratio by weight of the compound (E) to the compound (F) is between 1:9 and 9:1; and
    wherein the polypropylene-based resin comprises:
    (a) from 20 to 100% by weight of a propylene homopolymer and/or copolymer with at most 4% by weight of other olefin units, which has (i) a peak melting temperature (Tm) of 150° C. or above as measured through differential scanning calorimetry (DSC), (ii) a tensile modulus of elasticity of from 200 to 700 MPa, (iii) a pentad fraction, rrrr/(1-mmmm)×100, as measured through isotopic carbon nuclear magnetic resonance spectrometry ($^{13}$C-NMR) of from 20 to 60%, and (iv) a melting enthalpy (ΔH) as measured through differential scanning calorimetry (DSC) of from 10 to 100 J/g, and
    (b) from 0 to 80% by weight of a propylene copolymer containing from 10 to 80% by weight of non-propylene olefin units.

2. The film or sheet according to claim 1, wherein the ratio by weight of the compound (E) to the compound (F) is 1.75.

3. The film or sheet according to claim 1, wherein the ratio by weight of the compound (E) to the compound (F) is 0.57.

4. The film or sheet according to claim 1, wherein said polypropylene-based resin comprises 100% by weight of (a).

5. The film or sheet according to claim 1, wherein said polypropylene-based resin comprises 20% by weight of (a) and 80% by weight of (b).

6. The film or sheet according to claim 1, wherein said polypropylene-based resin has (i) a peak melting temperature (Tm) of 150° C. or above as measured through differential scanning calorimetry (DSC), (ii) a tensile modulus of elasticity of from 200 to 700 MPa, (iii) a pentad fraction, rrrr/(1-mmmm)×100, as measured through isotopic carbon nuclear magnetic resonance spectrometry ($^{13}$C-NMR) of from 20 to 60%, and (iv) a melting enthalpy (ΔH) as measured through differential scanning calorimetry (DSC) of from 10 to 100 J/g.

7. The film or sheet according to claim 1, wherein said polypropylene-based resin has a peak melting temperature (Tm) between 150 and 165° C.

8. The film or sheet according to claim 1, wherein said polypropylene-based resin has a tensile modulus of elasticity of from 400 to 600 MPa.

9. The film or sheet according to claim 1, wherein said polypropylene-based resin has a pentad fraction, rrrr/(1-mmmm)×100, as measured through isotopic carbon nuclear magnetic resonance spectrometry ($^{13}$C-NMR) of from 25 to 55%.

10. The film or sheet according to claim 1, wherein said polypropylene-based resin has a melting enthalpy (ΔH) as measured through differential scanning calorimetry (DSC) of from 20 to 100 J/g.

11. The film or sheet according to claim 1, wherein the other olefin unit in (a) is one or more olefins selected from the group consisting of α-olefin, ethylene, butene-1, pentene-1, 4-methyl-1-pentene, hexene-1, heptene-1, octene-1, nonene-1, decene-1, and combinations thereof.

12. The film or sheet according to claim 1, wherein the non-propylene olefin unit in (b) is one or more comonomer olefins selected from the group consisting of α-olefin, ethylene, butene-1, pentene-1, 4-methyl-1-pentene, hexene-1, heptene-1, octene-1, nonene-1, decene-1, diene, butadiene, dicyclopentadiene, tricyclopentadiene, and combinations thereof.

13. The film or sheet according to claim 1, wherein said polypropylene-based resin comprises not more than 70% by weight of (b).

14. The film or sheet according to claim 1, wherein said polypropylene-based resin comprises not more than 60% by weight of (b).

15. A laminated article, comprising the film or sheet according to claim 1 and an adhesive in contact with said film or sheet.

16. A decorative or protective film, comprising the film or sheet according to claim 1 and a printed substrate in contact with said film or sheet.

* * * * *